US010758777B2

(12) United States Patent
Kitazawa

(10) Patent No.: US 10,758,777 B2
(45) Date of Patent: Sep. 1, 2020

(54) TRAINING TOOL AND TRAINING METHOD USING THE TRAINING TOOL

(71) Applicant: Kazutoshi Kitazawa, Sapporo (JP)

(72) Inventor: Kazutoshi Kitazawa, Sapporo (JP)

( * ) Notice: Subject to any disclaimer, the term of this patent is extended or adjusted under 35 U.S.C. 154(b) by 0 days.

(21) Appl. No.: 16/484,717

(22) PCT Filed: Dec. 17, 2017

(86) PCT No.: PCT/JP2017/045229
§ 371 (c)(1),
(2) Date: Aug. 8, 2019

(87) PCT Pub. No.: WO2018/150710
PCT Pub. Date: Aug. 23, 2018

(65) Prior Publication Data

US 2020/0001131 A1 Jan. 2, 2020

(30) Foreign Application Priority Data

Feb. 16, 2017 (JP) ................................ 2017-042191

(51) Int. Cl.
*G09B 19/00* (2006.01)
*A63B 23/04* (2006.01)
(Continued)

(52) U.S. Cl.
CPC ....... *A63B 23/0464* (2013.01); *A61H 1/0262* (2013.01); *A63B 69/0028* (2013.01)

(58) Field of Classification Search
USPC ................ 434/247, 250, 255, 258; 473/440; 482/14, 23, 51, 78
See application file for complete search history.

(56) References Cited

U.S. PATENT DOCUMENTS

RE25,474 E * 11/1963 O'Rear .................. A63C 19/06 473/414
3,255,115 A * 6/1966 Peterson ............ A63B 69/0028 482/148

(Continued)

FOREIGN PATENT DOCUMENTS

JP 3034981 U 3/1997
JP 2004-305529 A 11/2004

(Continued)

OTHER PUBLICATIONS

International Search Report dated Feb. 13, 2018, issued in counterpart Application No. PCT/JP2017/045229 (2 pages).

(Continued)

*Primary Examiner* — Kurt Fernstrom
(74) *Attorney, Agent, or Firm* — Westerman, Hattori, Daniels & Adrian, LLP

(57) ABSTRACT

A tool for training and evaluating a motion control function through vision while the direction and range of motion is restricted by the tool, and a method for using the same, and to improve storage convenience. A training tool is configured such that lattices are formed by using a belt having a width (S) in a vertical direction and a horizontal direction to be spread out and placed on the floor or the ground. The training tool is formed from a plurality of lattices arranged in vertical and horizontal squares, and the length of a lattice in any one of the vertical and horizontal columns is the length of (L-S) that is shorter by the width of the belt than the length (L) of each of lattices in other columns, whereby the tool is foldable such that the tool is integrated to overlap with one lattice.

6 Claims, 13 Drawing Sheets

PATTERN OF 4 ROWS BY 3 COLUMNS (COMBINATION OF Fig 1(A) AND Fig 3(A))

(51) Int. Cl.
*A61H 1/02* (2006.01)
*A63B 69/00* (2006.01)

(56) References Cited

U.S. PATENT DOCUMENTS

| | | | | | |
|---|---|---|---|---|---|
| 3,345,068 | A * | 10/1967 | Bowen | A63B 5/22 473/414 |
| 3,768,809 | A * | 10/1973 | Ciarfello | A63C 19/06 473/414 |
| 4,134,586 | A * | 1/1979 | King | A63B 23/0464 473/440 |
| 4,176,471 | A * | 12/1979 | Roe | A61H 3/00 434/255 |
| 4,183,552 | A * | 1/1980 | Webster | A61B 5/1174 462/1 |
| 4,185,819 | A * | 1/1980 | Hartley | A63B 5/22 273/458 |
| 5,607,150 | A * | 3/1997 | Schnorr, III | A63B 69/3667 473/499 |
| 6,447,427 | B1 | 9/2002 | Myrland et al. | |
| 6,955,631 | B2 | 10/2005 | Chen Wu | |
| 7,060,000 | B2 * | 6/2006 | Carlson | A63B 69/0053 434/250 |
| 7,874,959 | B2 * | 1/2011 | Dieter | A63B 23/0464 473/414 |
| 8,257,817 | B2 * | 9/2012 | Jacob | B32B 5/26 428/107 |
| 8,465,290 | B1 * | 6/2013 | Rodriguez | A63B 5/22 434/247 |
| 9,039,575 | B2 * | 5/2015 | Holland | A63K 3/043 482/51 |
| 9,186,534 | B2 * | 11/2015 | Bollers | A63B 5/22 |
| 10,118,062 | B2 * | 11/2018 | Barr | A63B 5/00 |
| 2006/0247100 | A1 * | 11/2006 | Harker | A63B 5/16 482/23 |
| 2010/0298074 | A1 * | 11/2010 | Esposito | A63B 69/00 473/438 |

FOREIGN PATENT DOCUMENTS

| | | | |
|---|---|---|---|
| JP | 2006-223804 | A | 8/2006 |
| JP | 2006-517818 | A | 8/2006 |
| WO | 2004/073808 | A1 | 9/2004 |
| WO | 2007/103320 | A2 | 9/2007 |
| WO | 2007/103320 | A3 | 9/2007 |

OTHER PUBLICATIONS

Notice of Reasons for Refusal dated Oct. 29, 2018, issued in counterpart JP Application No. 2018-515897, with English translation (6 pages).

Decision to Grant a Patent dated Dec. 26, 2018, issued in counterpart JP Application No. 2018-515897, with English translation (5 pages).

* cited by examiner

[Fig. 1]
BASIC PATTERN 1 (4 ROWS BY 1 COLUMN) (LIKEWISE FOR 1 ROW BY 4 COLUMNS)
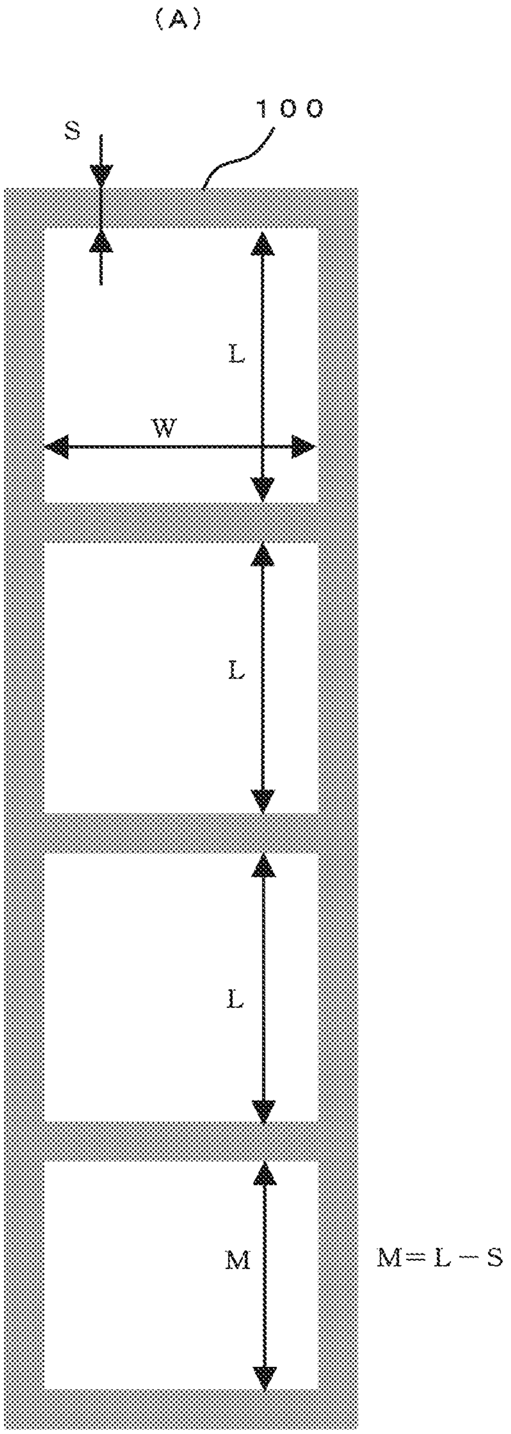

[Fig. 2-1]
FOLDING OF THE TOOL IN Fig. 1(A)
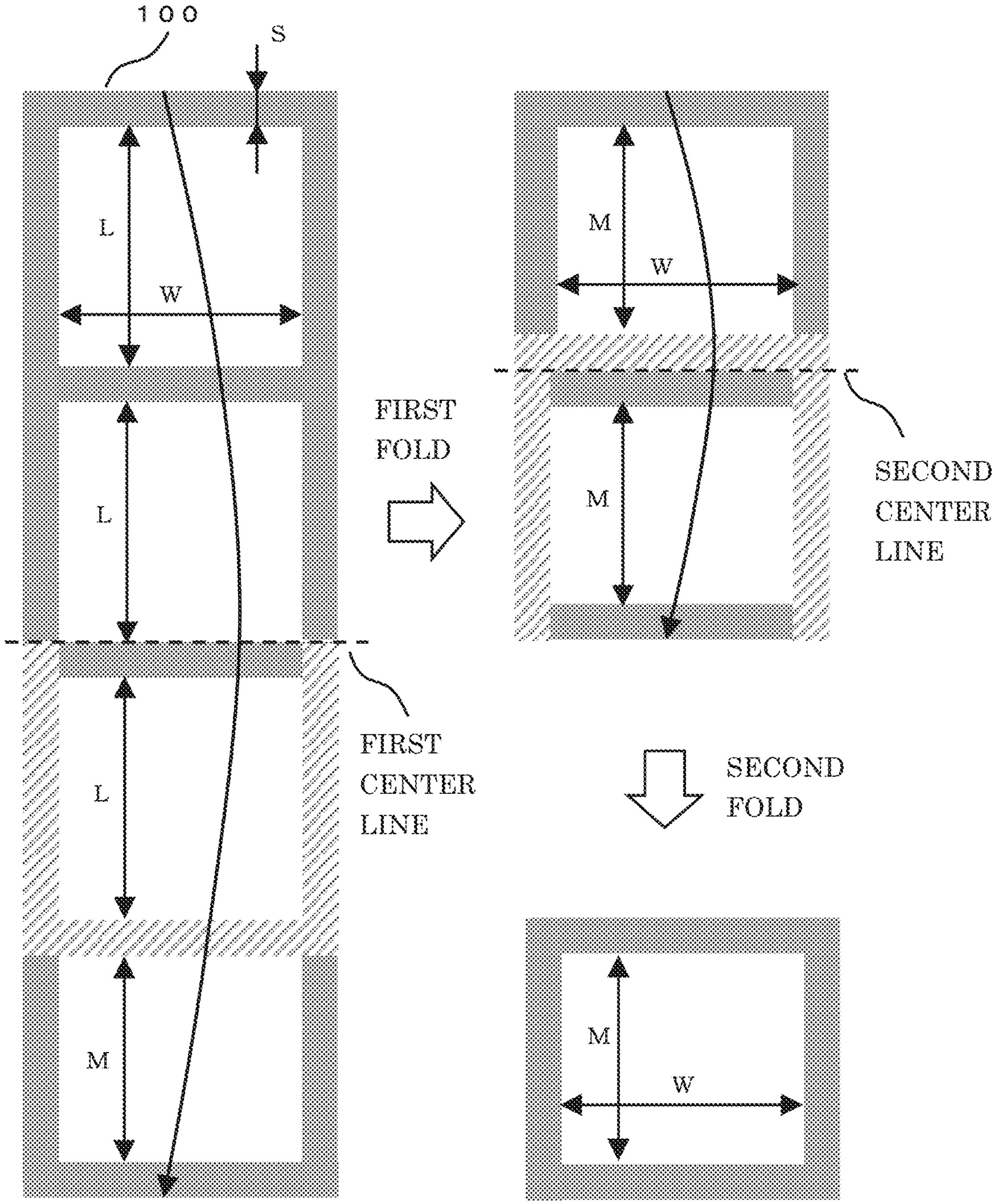

[Fig. 2-2]
FOLDING OF THE TOOL IN Fig. 1(B) (MODIFIED EXAMPLE OF Fig. 2-1)
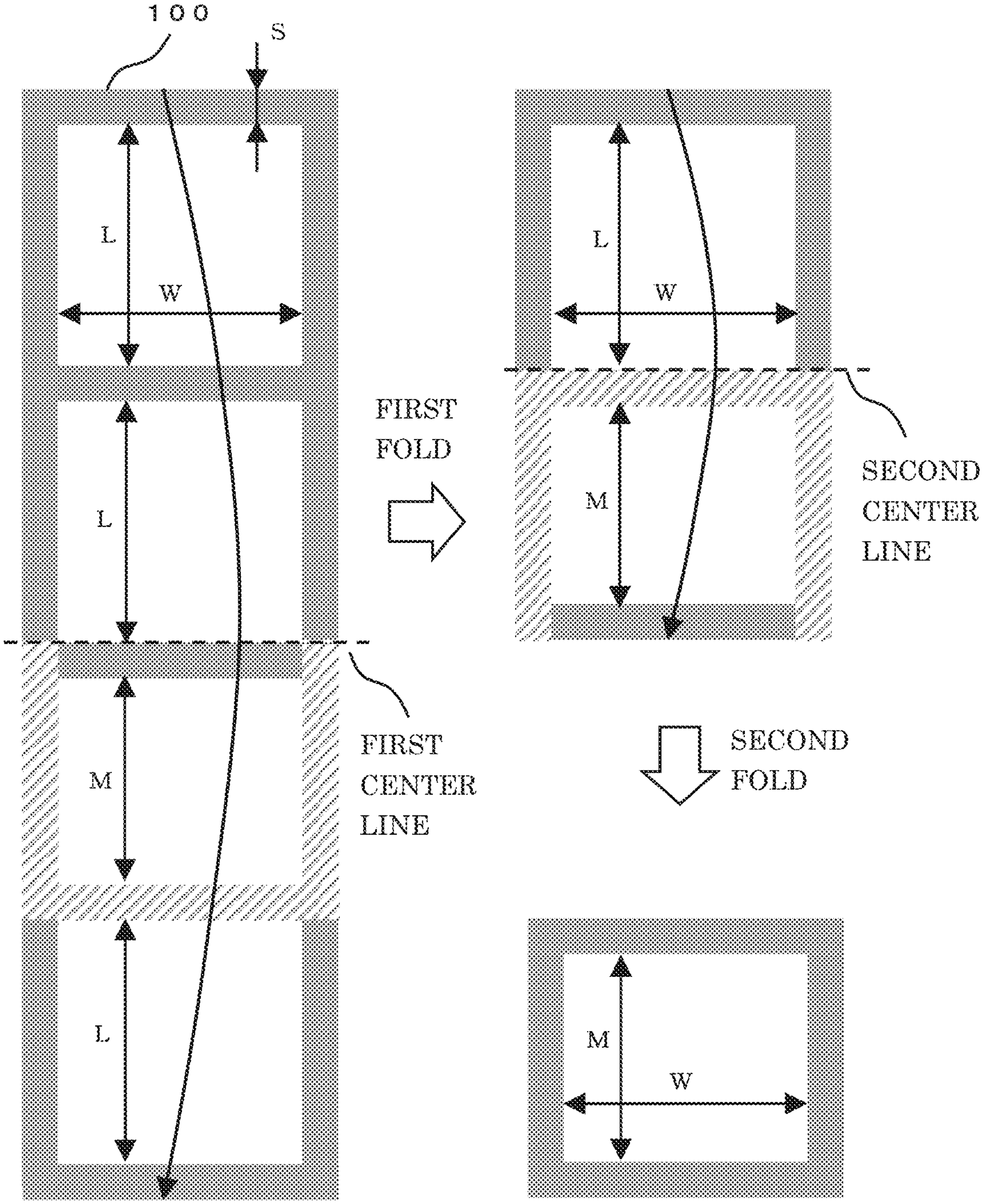

[Fig. 3]
BASIC PATTERN 2 (1 ROW BY 3 COLUMNS) (LIKEWISE FOR 1 ROW BY 3 COLUMNS)
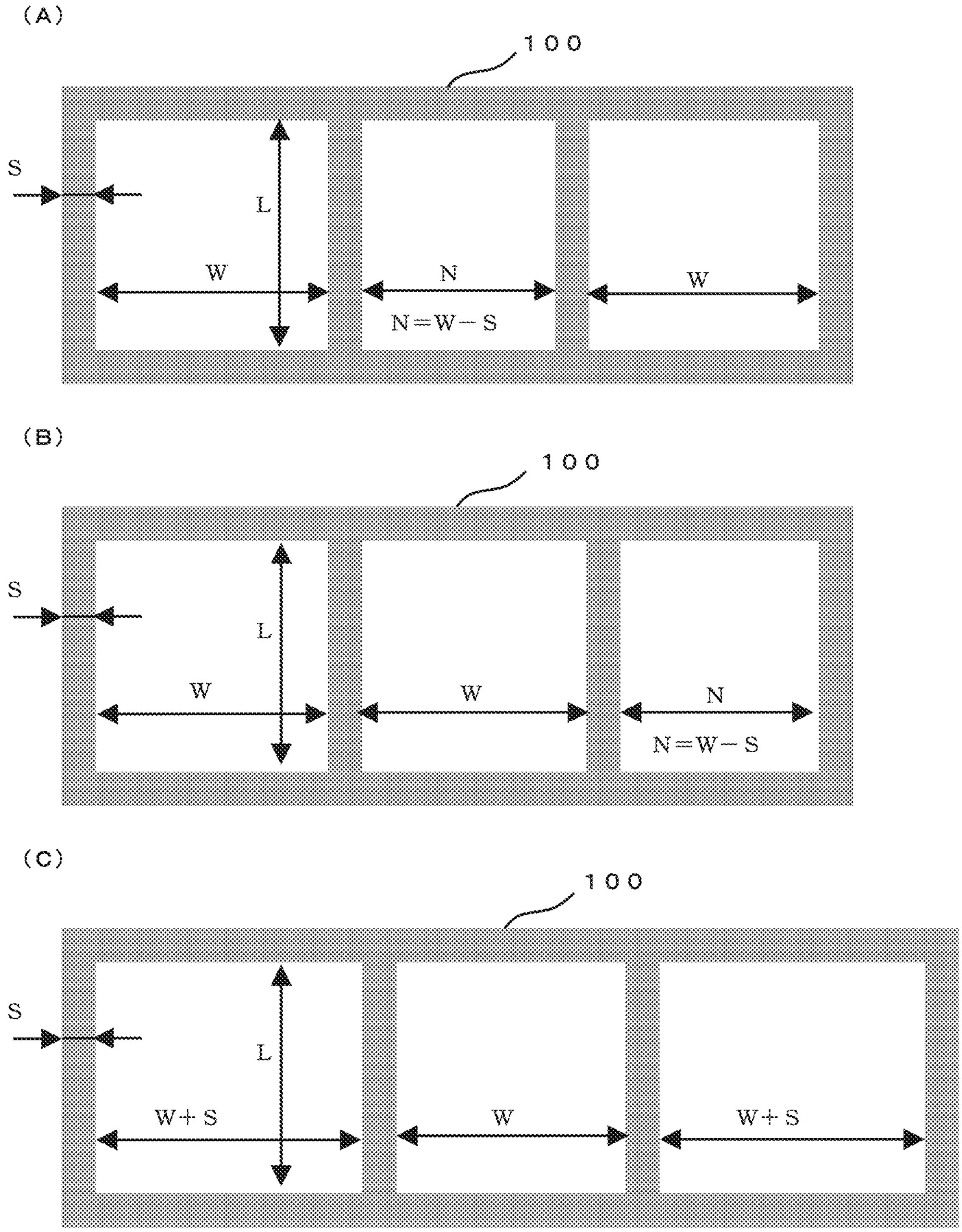

[Fig. 4]
FOLDING OF Fig. 3(A)
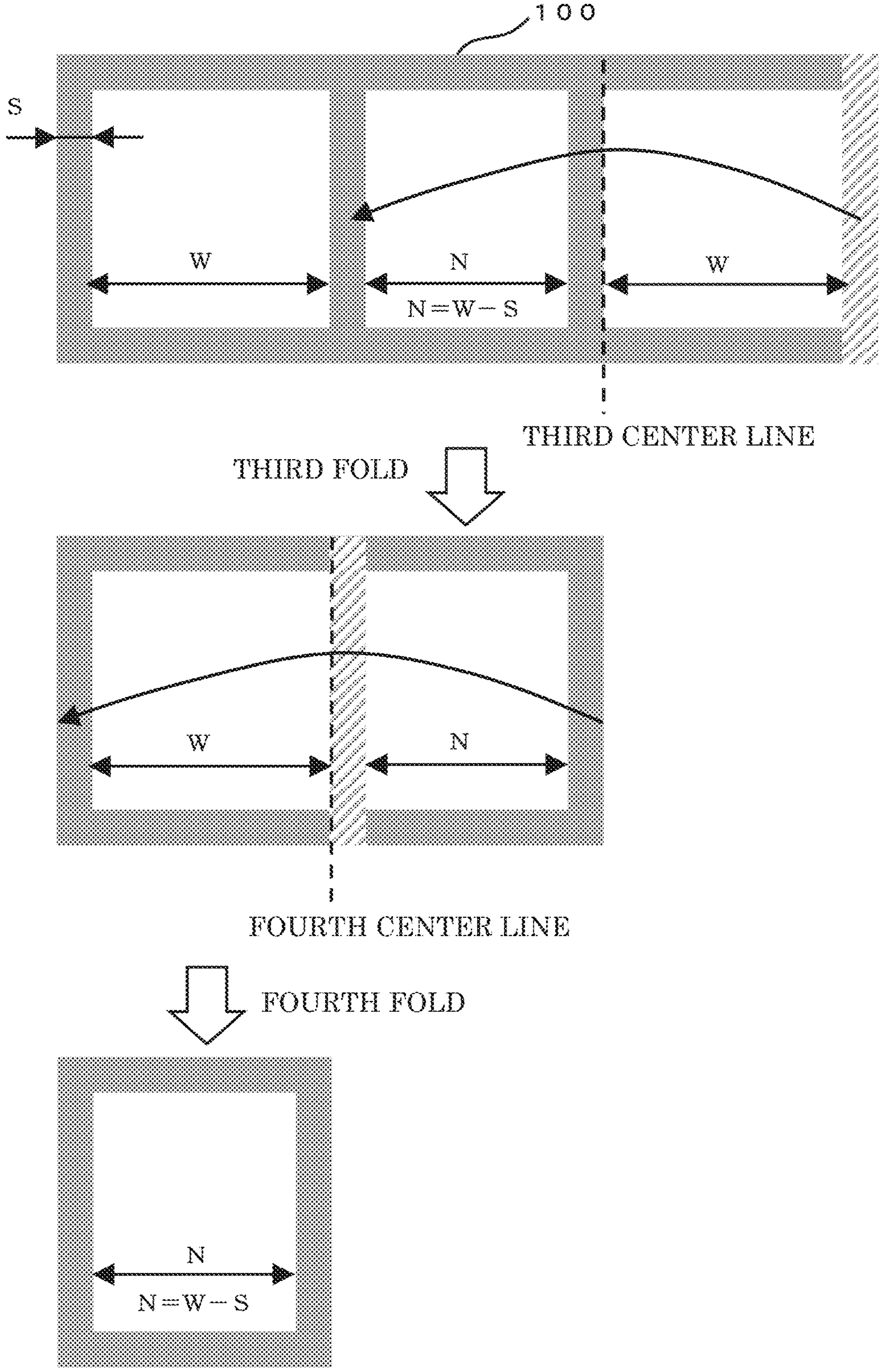

[Fig. 5]
PATTERN OF 4 ROWS BY 3 COLUMNS (COMBINATION OF BASIC PATTERN 1 AND BASIC PATTERN 2)
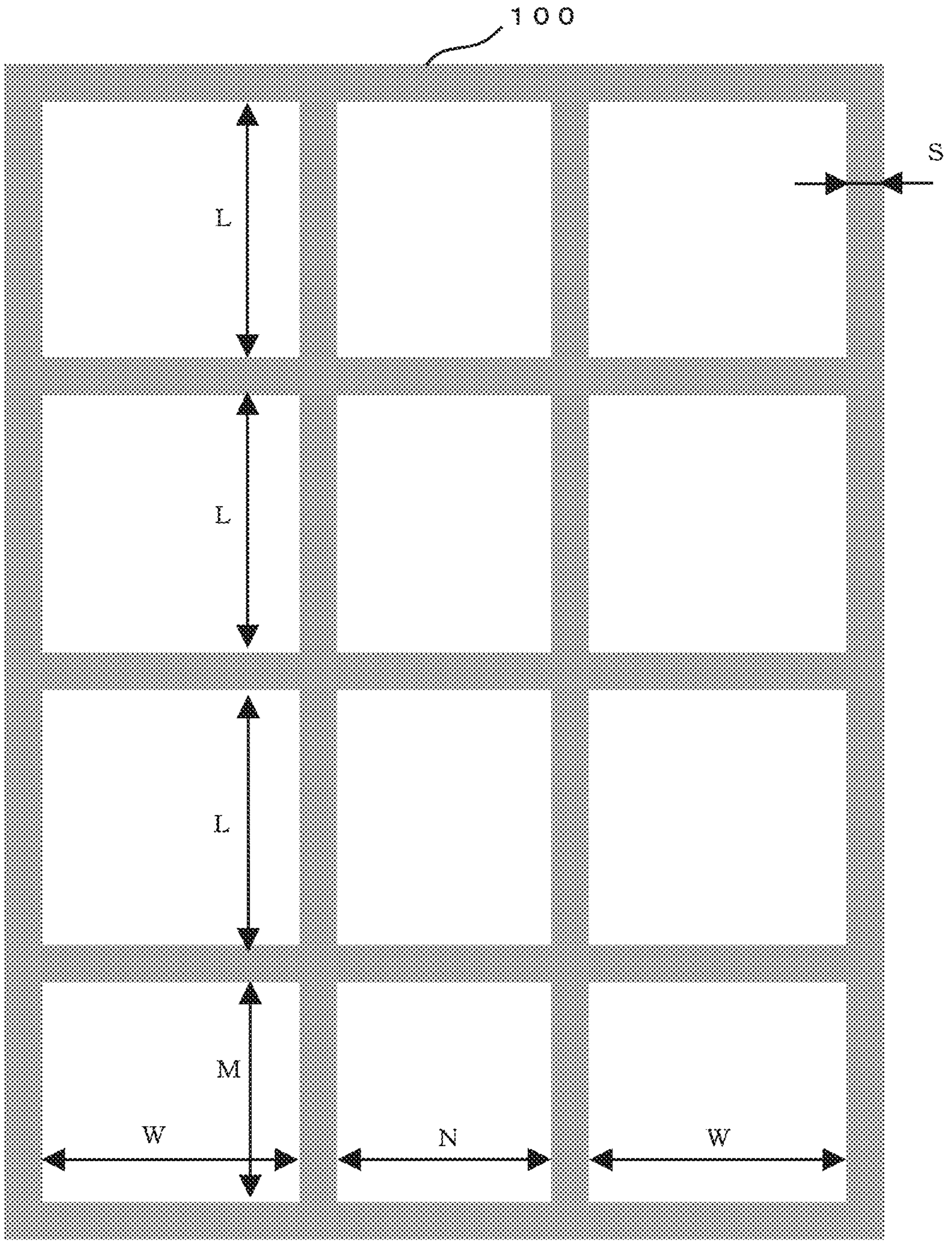
M = L − S
N = W − S

[Fig. 6-1]
PATTERN OF 4 ROWS BY 3 COLUMNS (COMBINATION OF Fig. 1(A) AND Fig. 3(A))
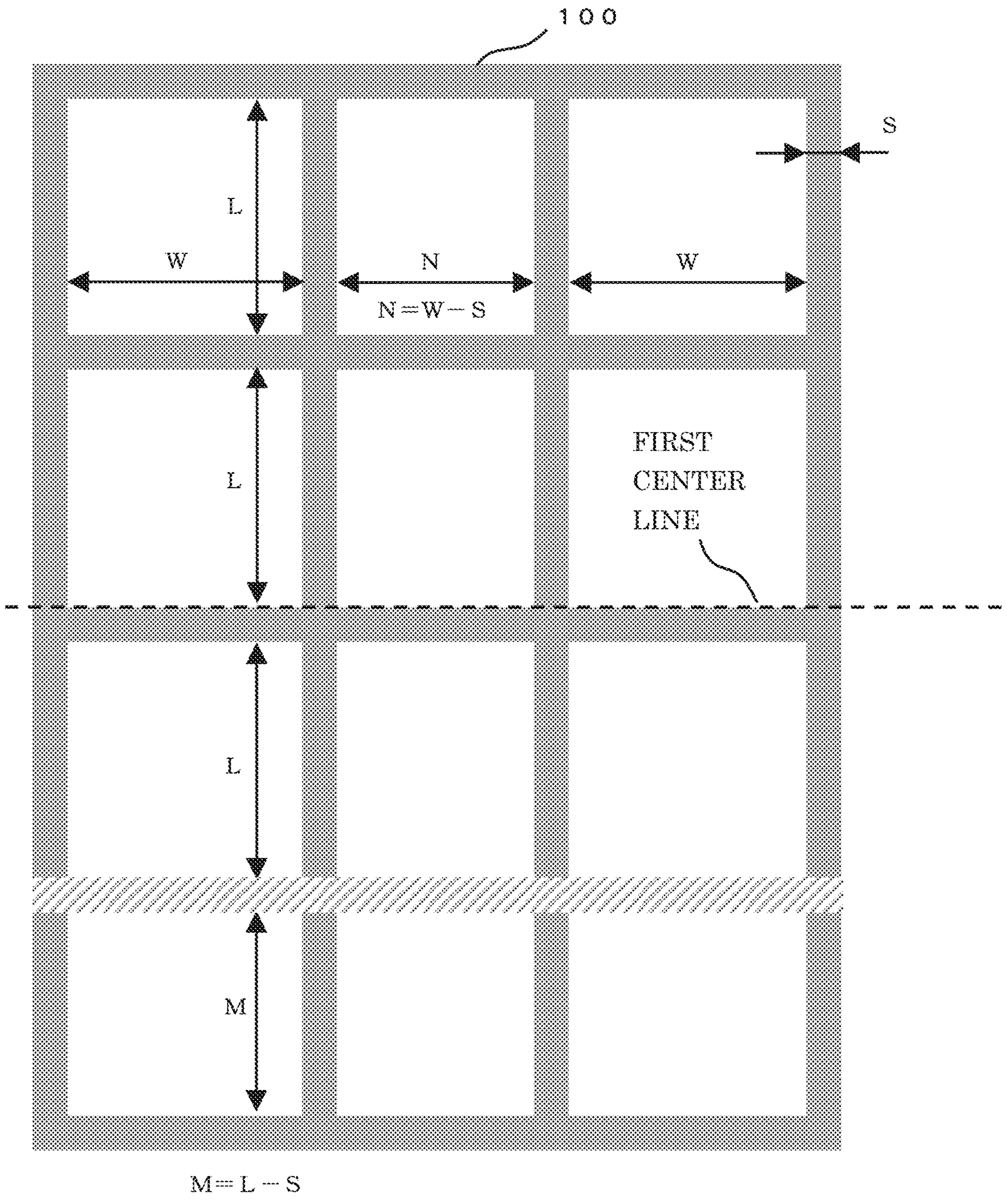

[Fig. 6-2]
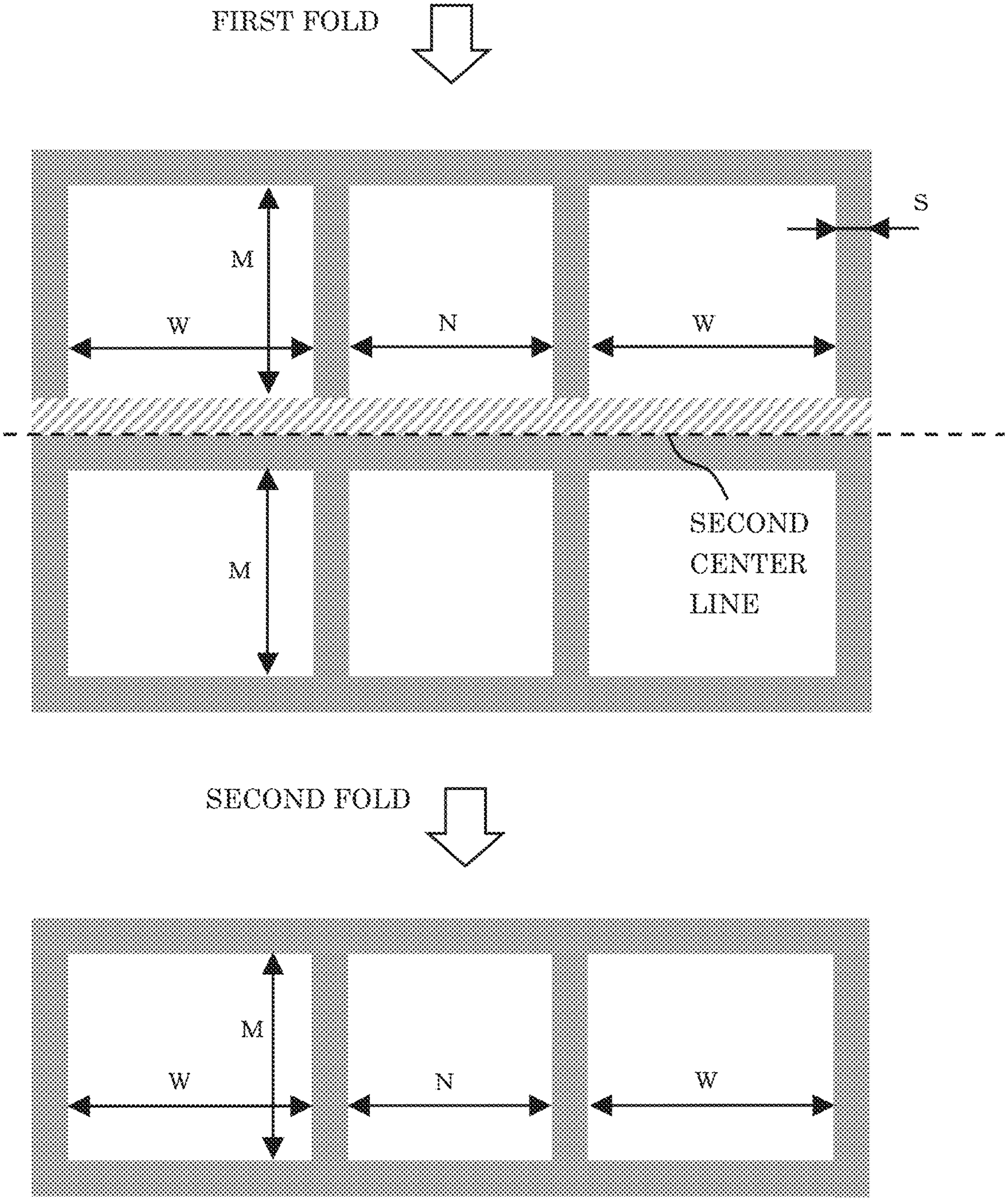

[Fig. 6-3]
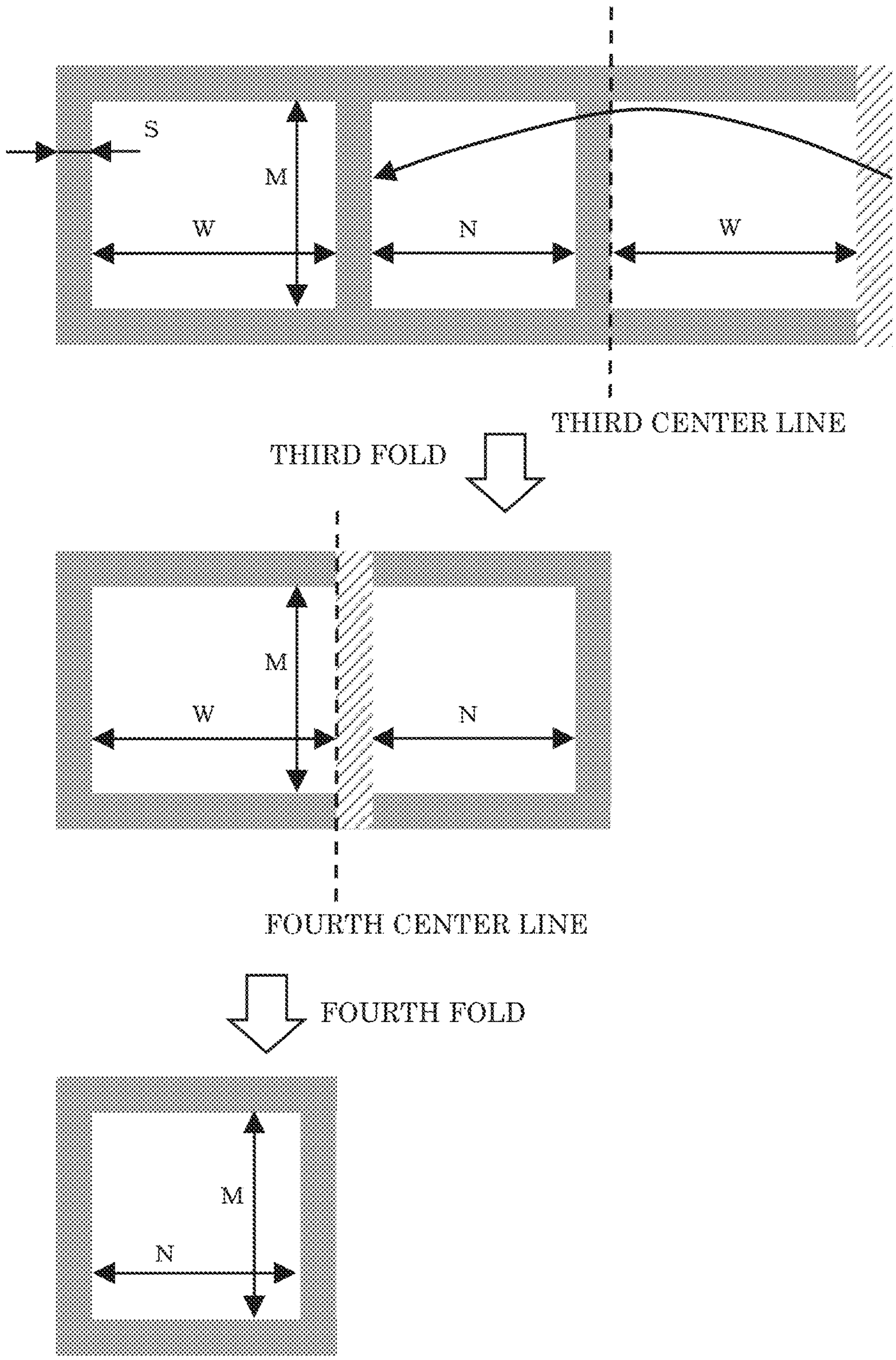

[Fig. 7]
PATTERN OF 3 ROWS BY 3 COLUMNS (COMBINATION OF BASIC PATTERN 1 AND BASIC PATTERN 2)
LIKEWISE FOR PATTERN OF 4 ROWS BY 4 COLUMNS
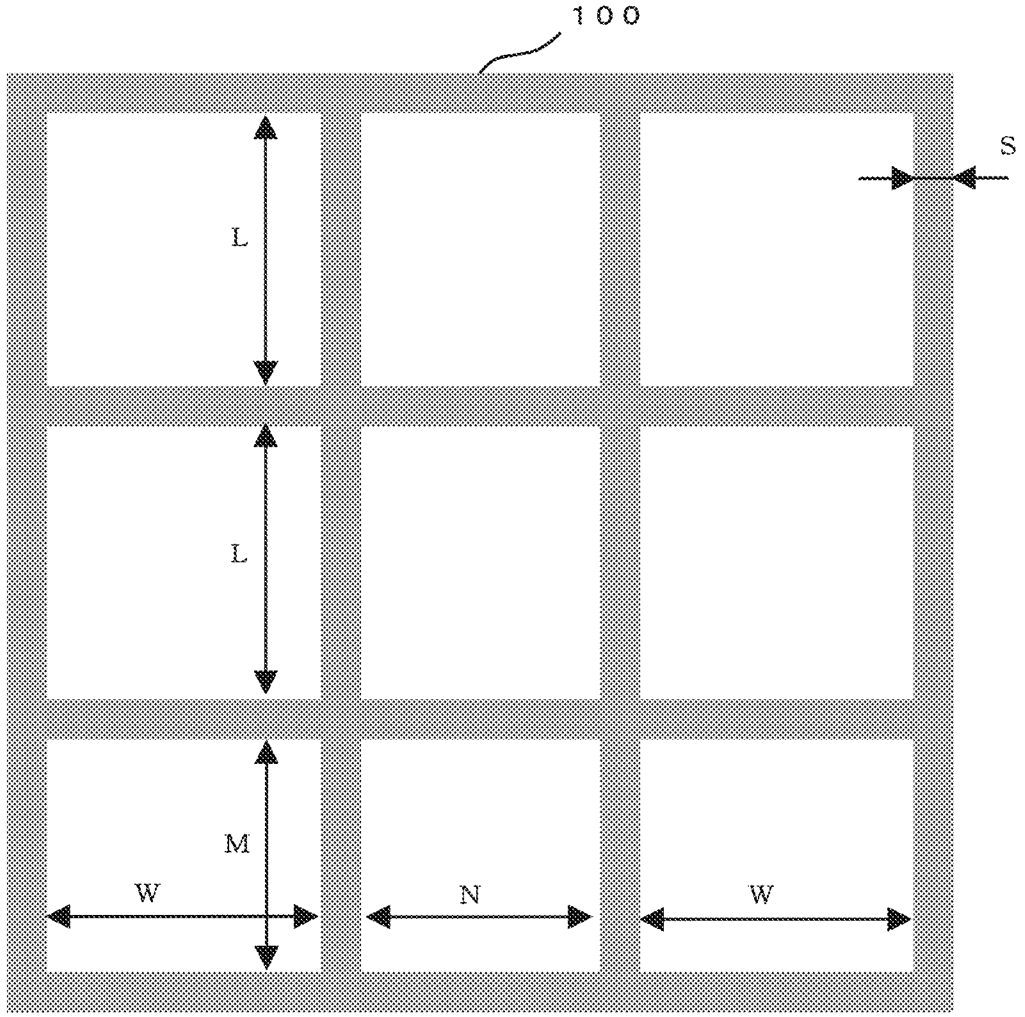
M=L−S
N=W−S

[Fig. 8]
BASIC PATTERN 3
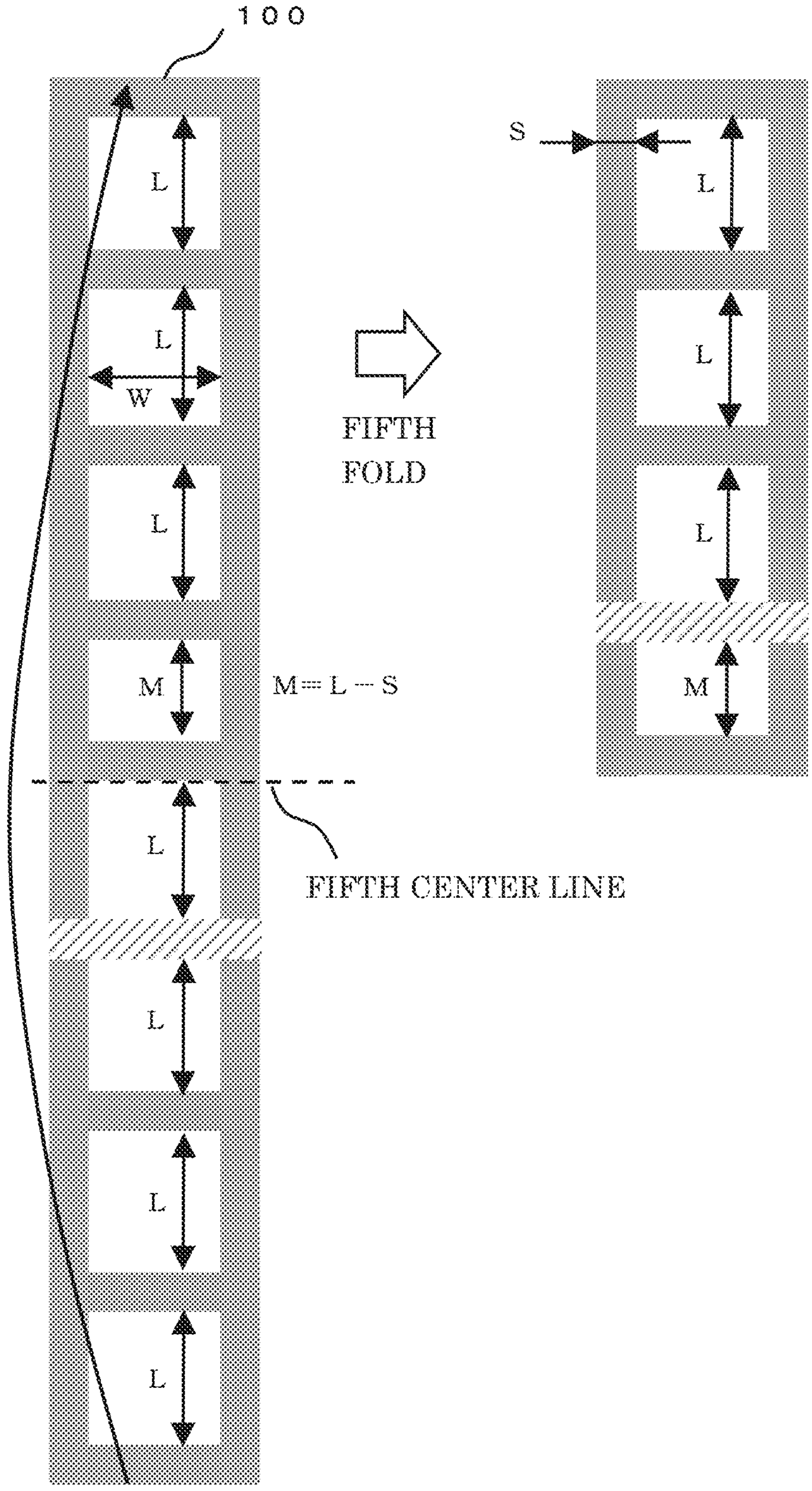

[Fig. 9]
BASIC PATTERN 4
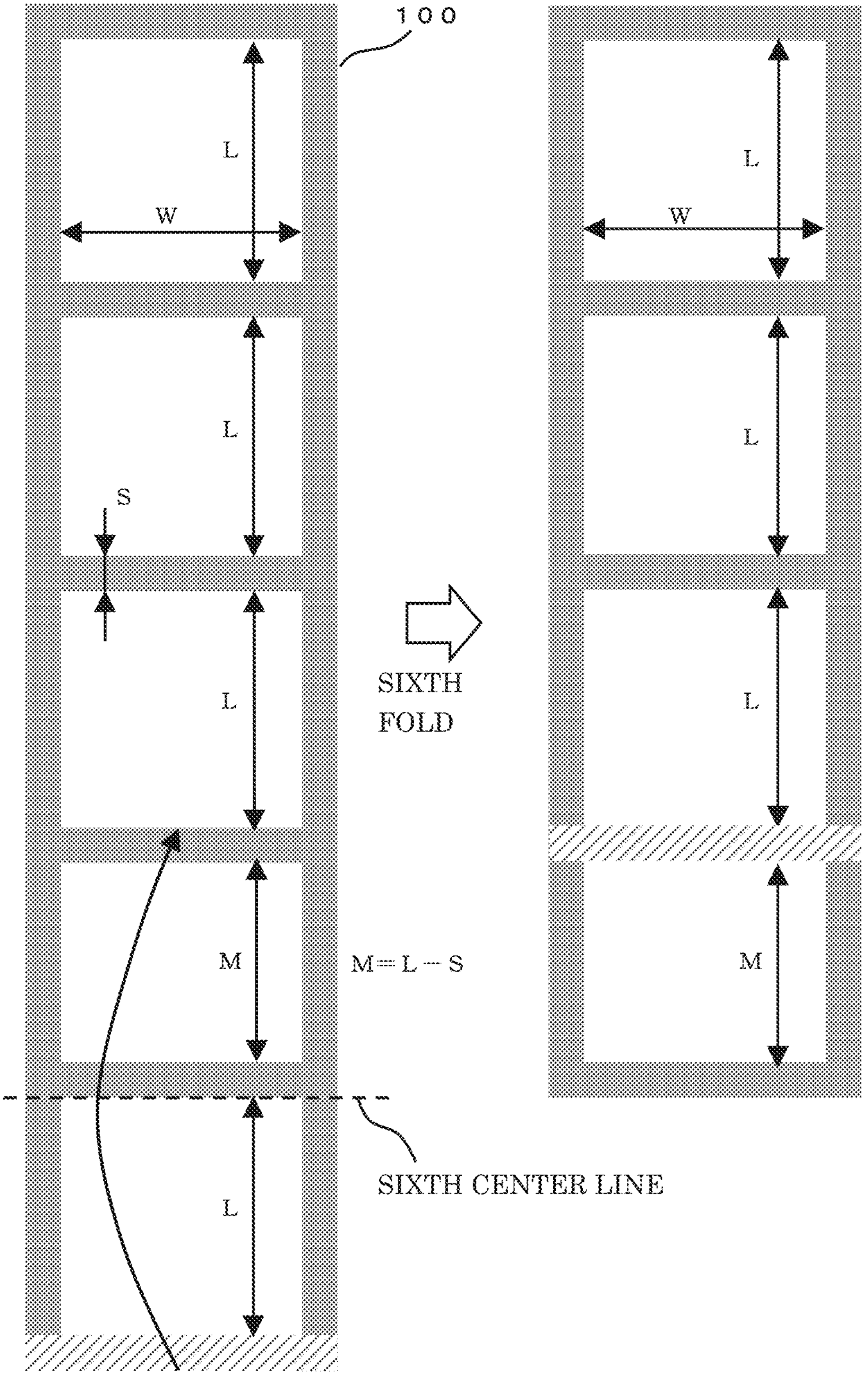

[Fig. 10]
TRAINING USING PATTERN OF 4 ROWS BY 3 COLUMNS
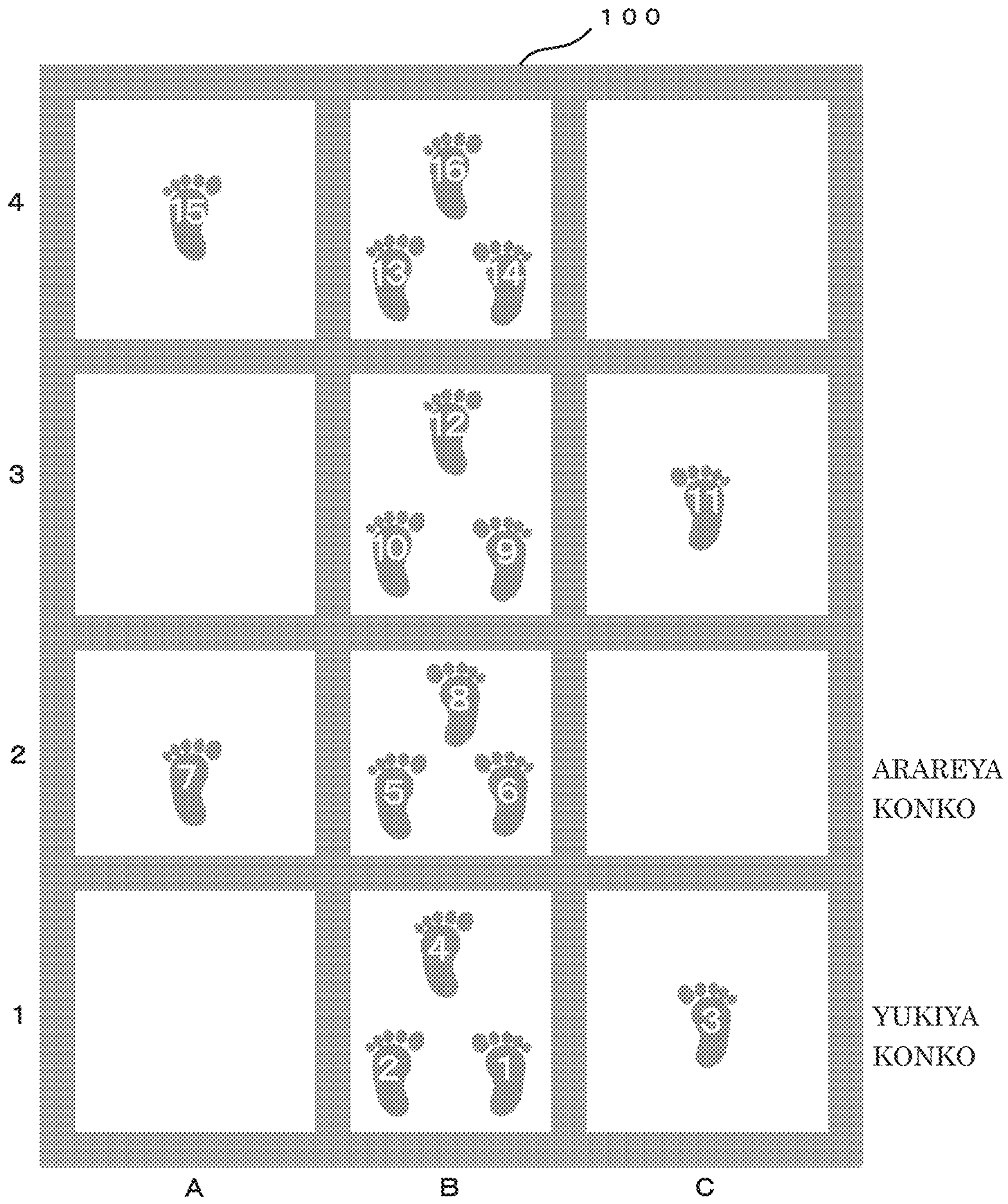

TRAINING TOOL AND TRAINING METHOD USING THE TRAINING TOOL

TECHNICAL FIELD

The present invention provides a training tool for training and evaluating motion-controlling functions depending on the sense of sight while restricting the direction and range of the basic motions such as walking, moving, and direction-switching, and a method of using the training tool. Moreover, with the training tool according to the present invention, higher human mental functions, such as cognitive ability, attentiveness, and concentration, are activated, and improvements in storage and carrying convenience as well as convenience when unfolding the training tool for further use are achieved.

BACKGROUND ART

Walking and the like are known to be effective in preventing motor functions and cognitive functions from deteriorating in elderly people and people with physical disabilities.

However, simply walking aimlessly alone is not enough to bring about a significant effect in terms of preventing motor functions and cognitive functions from deteriorating, and therefore predetermined exercise programs are implemented on a plurality of people gathered together in a community center or classrooms of various types.

By adjusting the content of the exercise program at this time, improvements in general motor functions such as physical strength, balance, and stamina can be expected, but cognitive functions such as attentiveness, concentration, spatial awareness, and memory cannot be sufficiently maintained and improved.

Therefore, attempts have been made to improve cognitive functions and so on in addition to motor functions using tools.

For example, PTL 1 describes using a grid formed from cells of a predetermined size, and having a trainee perform a walking motion without stepping on the net. The walking motion requires cognitive ability and attentiveness, and therefore the motor functions and mental functions of the exerciser are trained.

Further, PTL 2 describes using an exercise tool on the upper surface of a rectangular mat. The tool has cells that are smaller than the size of a foot so that the exerciser are forced to stay on tiptoe, and as a result, the muscles required to prevent falls and coordination skills such as agility are trained efficiently.

CITATION LIST

Patent Literature

[PTL 1] Japanese Patent Application Publication No. 2006-223804

[PTL 2] Japanese Patent Application Publication No. 2004-305529

SUMMARY OF INVENTION

Technical Problem

According to PTL 1, by placing the net, which is formed from vertically and horizontally arranged cells of a predetermined size, on the ground and having an exerciser walk thereon in a predetermined pattern, the exerciser remains attentive so as not to step on the net while walking step by step, and as a result, the motor functions and mental functions of the exerciser are trained.

However, there is no correlative relationship between the size (length) of the cells and the width (length) of the strips partitioning the cells, and therefore, when the training tool is folded, the large number of cells overlap irregularly. As a result, the training tool cannot be folded compactly and becomes entangled or the like, making disentangling the tool during the next use laborious.

Furthermore, the cells are uniformly shaped and identically sized, and therefore, once a fixed step length has been memorized by the body of trainee, it becomes comparatively easy not to step on the net. As a result, there is a limit to the difficulty setting and the level to which the walking motion of the exerciser is restricted.

Moreover, in PTL 2, an exercise tool in which cells that are slightly smaller than the size of a foot is formed integrally with a rectangular mat is used on the upper surface of the mat to force the exerciser to stay on tiptoe. As a result, the muscles important for preventing falls and coordination skills such as agility are trained efficiently while keeping the exerciser in the unbalanced state of being on tiptoe.

Due to the property of the exercise tool whereby the cells that are slightly smaller than the size of a foot are formed integrally with the mat, however, increases in thickness and weight are inevitable, meaning that the exercise tool is not suitable for being stored in a folded state.

Further, by providing height differences and causing the exerciser to feel the height differences through the sole of the foot so as to remain within the cells, and by forcing the exerciser to exercise in the unbalanced state of being on tiptoe, there is a strong tendency to mainly train the feeling in the sole of the foot and the sense of balance, whereas the training of higher mental functions, including cognitive functions, while having the exerciser perform a restricted motion by introducing a program of advancing by performing a combination of complicated steps in order to activate the overall sight-based judgment and coordination functions of the brain is not realized sufficiently.

Furthermore, the cells are uniformly sized, and therefore, once the exerciser becomes accustomed to the size of the cells, it is possible to avoid stepping on the mat by moving at a step length memorized as a physical sensation rather than by a sight-based judgment function of the brain. As a result, a cooperation function between the visual and motor centers cannot be trained sufficiently.

Moreover, the size of the cells is small, making it impossible to perform a motion by which both feet step inside a single cell. As a result, it is impossible to train diverse motions such as a motion for switching between the feet at a good tempo, a motion for keeping both feet in the same cell, and motions for moving one foot out of the cell into another cell and redirection-switching the foot moved to the other cell back to the original cell.

Solution to Problem

To achieve the objects described above, a training tool according to a first aspect of the invention is to be unfolded and spread out on the floor or the ground, the training tool being configured to comprise strips of a predetermined width (S) extending in a vertical direction and a horizontal direction so as to form cells of a predetermined length, wherein the tool is constituted by cells arranged on i rows by 1 column or 1 row by j columns (where i and j are integers of 3 or more), and the cells on any one row or column are constituted by short cells having a length (M or N) that is shorter than a length (L or W) of the cells in the other rows or columns by the width (S) of the strip.

A training tool according to a second aspect of the invention is to be unfolded and spread out on the floor or the ground, the training tool being configured to comprise strips of a predetermined width (S) extending in a vertical direction and a horizontal direction so as to form cells of a predetermined length, wherein the tool is constituted by cells arranged on i rows by j columns by combining cells arranged on i rows by 1 column, among which the cells in any one row are constituted by short cells having a length (M) that is shorter than a length (L) of the cells in the other rows by the width (S) of the strip, and cells arranged on 1 row by j columns, among which the cells in any one column are constituted by short cells having a length (N) that is shorter than a length (W) of the cells in the other columns by the width (S) of the strip.

A training tool according to a third aspect of the invention is the training tool according to the first invention, the tool being constituted by cells arranged on i rows by 1 column, wherein, when i is 4 such that the tool is constituted by cells arranged on 4 rows by 1 column, and a first fold is performed vertically using, as a first center line, an outer edge of a center strip that divides the entire tool vertically into two such that an uppermost strip and a lowermost strip of the tool overlap each other, a vertical deviation corresponding to the width of the strip occurs between a strip of the short cell and a strip of the other folded row, and when a second fold is further performed vertically using a gap between the two strips, which is formed by the deviation, as a second center line, the strips forming all of the cells overlap each other, whereby the tool is folded so as to form a single cell.

A training tool according to a fourth aspect of the invention is the training tool according to the first invention, the tool being constituted by cells arranged on 1 row by j columns, wherein, when j is 3 such that the tool is constituted by cells arranged on 1 row by 3 columns, and a third fold is performed using one of the outer edges of the short cell as a third center line such that the strips of the short cell and the strips forming another cell overlap each other, whereupon a fourth fold is performed using the other outer edge of the short cell as a fourth center line such that the strips of the short cell and the strips forming the other cells overlap each other, the strips forming all of the cells overlap each other, whereby the tool is folded so as to form a single cell.

A training tool according to a fifth aspect of the invention is the training tool according to the second invention, the tool being constituted by cells arranged on i rows by j columns, wherein, when i is 4 and j is 3 such that the tool is constituted by cells arranged on 4 rows by 3 columns, by performing the first and second folds and then performing the third and fourth folds, the strips forming all of the 12 cells on the 4 rows by 3 columns overlap each other, whereby the tool is folded so as to form a single cell.

A training tool according to a sixth aspect of the invention is the training tool according to the second invention, the tool being constituted by cells arranged on i rows by j columns, wherein, when i is 8 and j is 3 such that the tool is constituted by cells arranged on 8 rows by 3 columns, by performing a fifth fold using, as a fifth center line, the outer edge of the center strip that divides the entire tool vertically into two and then performing the first and second folds and the third and fourth folds in sequence, the strips forming all of the 24 cells on the 8 rows by 3 columns overlap each other, whereby the tool is folded so as to form a single cell.

A training method according to a seventh aspect the invention is a training method for improving motor functions and higher control functions such as a cooperation function between the visual and motor centers by spreading out the training tool according to any one of the first to sixth inventions on the floor or the ground and having a trainee combine a stamping motion performed inside the cell, a motion for stepping into another cell, and a direction-switching motion, the method including: determining in advance, on the basis of the rhythm of a predetermined song, step advancement rules relating to a combination and a sequence of a stepping action for stamping inside a cell, a stepping action for moving a leg into another cell, and a stepping action for switching direction so that steps are performed in time with the predetermined song, requiring the trainee to perform stepping actions determined in accordance with the step advancement rules, and training the motor functions and the cooperation function between the visual and motor centers so as to improve the motor functions and the cooperation function between the visual and motor centers by introducing a rule prohibiting the trainee from stepping on the strips partitioning the cells so that the motions performed by the trainee to remain in a cell and move to another cell, the cells having a predetermined size determined in accordance with a step length of the legs, are restricted.

An eighth aspect invention relates to the training method according to the seventh invention, wherein a training effect is enhanced by evaluating a level of achievement of the training on the basis of the number of times the trainee steps on the strips, recording a result of the evaluation, and comparing the result with past results.

Advantageous Effects of Invention

According to the present invention, a correlative relationship is established in the cells forming the training tool between the size (length) of the cells and the width of the strips partitioning the cells. Therefore, when the training tool is folded, the large number of cells overlap regularly, with the result that the tool can be folded compactly. As a result, the strips do not become entangled and can therefore be disentangled easily and deployed quickly during a subsequent use.

Further, according to the present invention, by establishing a correlative relationship between the size (length) of the cells and the width of the strips partitioning the cells, a predetermined cell is formed at a different length to the other cells such that irregularity is introduced into the cell arrangement. The trainee can thus be required to exhibit further dexterity while performing stamping, moving, and direction-switching motions depending on the sense of sight, and therefore activation of the overall judgment functions of the brain in addition to the motor functions can be encouraged. As a result, higher mental functions, including cognitive functions, can be trained.

BRIEF DESCRIPTION OF DRAWINGS

FIG. 1 is a view showing an example of a training tool constituted by four cells arranged on 4 rows by 1 column or 1 row by 4 columns.

FIG. 2-1 is a view showing a procedure for folding the training tool shown in FIG. 1(A).

FIG. 2-2 is a view showing a procedure for folding the training tool shown in FIG. 1(B).

FIG. 3 is a view showing an example of a training tool constituted by three cells arranged on 1 row by 3 columns or 3 rows by 1 column.

FIG. 4 is a view showing a procedure for folding the training tool shown in FIG. 3(A).

FIG. 5 is a view showing an example of a training tool constituted by twelve cells arranged on 4 rows by 3 columns or 3 rows by 4 columns.

FIGS. 6-1 to 6-3 are views showing procedures for folding a training tool constituted by twelve cells arranged on 4 rows by 3 columns.

FIG. 7 is a view showing an example of a training tool constituted by twelve cells arranged on 3 rows by 3 columns, rows by 4 columns, and so on.

FIG. 8 is a view showing an example of a training tool constituted by eight cells arranged on 8 rows by 1 column or row by 8 columns.

FIG. 9 is a view showing an example of a training tool constituted by five cells arranged on 5 rows by 1 column or 1 row by 5 columns.

FIG. 10 is a view showing a pattern of walking, stamping, moving, and direction-switching motions using the training tool according to the present invention.

DESCRIPTION OF EMBODIMENTS

1. Basic Pattern 1 (4 Columns by 1 Row, Likewise for 1 Column by 4 Rows) of Rraining Tool The training tool according to the present invention is to be unfolded and spread out on the floor or the around, and, for this purpose, is configured such that cells of a predetermined length are formed using strips (a net) of a predetermined width (S) in a vertical direction and a horizontal direction. The training tool is formed from a plurality of cells arranged as squares in three or more vertical columns or three or more horizontal columns, and may take various forms as long as the length (L-S, W-S) of the cells in any one of the vertical and horizontal columns is shorter than the length (L, W) of the cells in the other columns by the width (S) of the strip.

The training tool according to the present invention is used with the aim of training, maintaining, and strengthening motor functions and cooperation between the visual and motor centers of the brain using walking, stamping, moving, and direction-switching motions, and therefore the inside length (L, W) of the cells are large enough to accommodate both feet. Accordingly, the inside length of the cells is preferably set at approximately 450±30 mm for Japanese adults and approximately 500±30 mm for larger Western adults, although the present invention is not limited thereto.

Further, the width S of the strip (the net) is preferably approximately 10 to 100 mm. At approximately 50 mm, it is particularly easy to see the strips and to determine whether the net has been stepped on, and therefore approximately 50 mm is suitable for training for strengthening cooperation between the visual and motor centers, although the present invention is not limited thereto.

Furthermore, for ease of description, the width of the strip is set as the width S, but the width in a vertical extension direction does not have to be the same as the width in a horizontal extension direction, and the respective widths may be different.

Moreover, fabric woven using cotton, hemp, silk, woolen fabric, or chemical fiber as a base is preferably used as the material of the strips (the net), but the strips may also be formed from rubber or woven metal fiber.

Among these configurations, a comparatively simple configuration in which the training tool is constituted by cells arranged as squares in 4 rows by 1 column or 1 row by 4 columns will now be described with reference to FIG. 1(A) and FIG. 1(B).

FIG. 1(A) shows an example of a case in which a short cell having a vertical direction length that is shorter than that of the cells on the other rows (the vertical direction length inside these cells being L) by the width (S) of the strip (the net) (i.e. the vertical direction length N inside the short cell=L-S) is formed on the bottom row.

FIG. 1(B) shows a modified example of FIG. 1(A), in which a short cell having a vertical direction length that is shorter than that of the cells on the other rows by the width of the strip (the net) is formed on the second row from the bottom.

Furthermore, although not shown in the figures, as long as one short cell in which the column length is similarly shorter than that of the cells in the other rows by the width of the strip (the net) is included in any one of rows (stages), the short cell may be formed on the top row or the second row from the top.

Next, with reference to FIG. 2-1, a method of folding the training tool shown in FIG. 1(A) so that the strips forming the four cells overlap regularly, whereby the training tool can be folded compactly so as to form a single cell, will be described.

In basic pattern 1 (4 rows by 1 column) of the training tool, as illustrated in FIG. 1(A), the length of the bottom cell is shorter than the lengths of the other cells by the width of the strip, and therefore, by folding the training tool vertically using the outer edge of the strip forming the second cell from the bottom as a center line (a first center line), the tool can be folded so that the outer edges of the cells on the upper and lower ends overlap (first fold).

Here, in FIG. 2-1, by partially shading the second cell from the bottom, the manner in which the positional relationship between the top cell and the second cell from the bottom is adjusted can be seen, and it is evident that at the stage following the first fold, the strips (the shaded part) forming the second cell from the bottom and the lower side strip forming the top cell have a positional relationship of top-bottom contact.

Then, by folding the training tool vertically using the line on which the strips contact each other as the center line (a second center line) of the next fold (second fold), the training tool can be folded so that finally, the plurality of strips overlap each other in a single cell.

Note that by adjusting the length of the second cell from the bottom or the second cell from the top and the width of the strips, the boundary between these two cells (the second center line) can be formed into a center line having a width of several millimeters, and as a result, folding can be performed even more easily.

FIG. 2-2 is a view showing a modified example of FIG. 2-1, in which the training tool of FIG. 1(B) is folded so that the strips forming the four cells overlap regularly, whereby the training tool can be folded compactly so as to form a single cell. FIG. 2-2 is basically the same as FIG. 2-1 but differs from FIG. 2-1 in that the first and second center lines and the first and second folds are slightly modified in terms of the positional relationships between the respective cells.

2. Basic Pattern 2 (3 Rows by 1 Column, Likewise for 1 Row by 3 Columns) of Training Tool Another comparatively simple configuration in which the training tool is constituted by cells arranged as squares in 1 row by 3 columns or 3 rows by 1 column will now be described with reference to FIGS. 3(A), 3(B), and 3(C).

FIG. 3(A) shows an example of a case in which a short cell having a horizontal direction length that is shorter than that of the cells in the other columns (the horizontal direction length inside these cells being N) by the width (S) of the strip (i.e. the horizontal direction length N inside the short cell=W-S) is formed in the center.

FIG. 3(B) shows a modified example of FIG. 3(A), in which a short cell having a horizontal direction length that is shorter than that of the cells in the other columns by the width of the strip is formed on the second row from the bottom.

FIG. 3(C) is a modified example of FIG. 3(A), showing a case in which the horizontal direction length of the center cell is shorter than the horizontal direction length of the other cells by the width of the strip, which is equivalent to a case in which the length of one cell is shorter than the length of the other cells by the width of the strip.

Furthermore, although not shown in the figures, as long as one short cell in which the row length is similarly shorter than that of the cells in the other columns by the width of the strip is included in any one of rows (stages), the short cell may be formed on the left.

Next, using FIG. 4, a method of folding the training tool shown in FIG. 3(A) so that the strips forming the three cells overlap regularly, whereby the training tool can be folded compactly so as to form a single cell, will be described.

In basic pattern 2 (1 row by 3 columns) of the training tool, as illustrated in FIG. 3(A), the length of the center cell is shorter than the length of the other cells by the width of the strip, and therefore, by folding the training tool in the left-right direction using the outer edge of the strip forming the center cell as the center line (a third center line), the tool can be folded so that the strip forming the cell on the left end and the strip forming the cell on the right end (the shaded parts) overlap (third fold).

Then, by folding the training tool in the left-right direction using the left end of the overlapping strips of these two cells as the center line (a fourth center line) of the next fold (fourth fold), the training tool can be folded so that finally, the plurality of strips overlap each other in a single cell.

3. Pattern Constituted by a Large Number of Cells Obtained by Combining Basic Patterns The configurations and folding characteristics of basic pattern 1 (4 rows by 1 column) and basic pattern 2 (1 row by 3 columns) of the training tool were described above as comparatively simple configurations of the training tool, but a training tool having 12 cells arranged on 4 rows by 3 columns (likewise for 3 rows by 4 columns), such as that shown in FIG. 5, for example, may be obtained by combining these basic patterns.

FIG. 5 shows an example in which the cells on the bottom row and the cells in the center column are formed from short cells that are shorter than the other cells by the width of the strip, but the present invention is not limited thereto, and any configuration in which the cells on any one row are shorter in length than the cells on the other rows by the width of the strip and the cells in any one column are shorter in length than the cells in the other columns by the width of the strip may be employed.

Next, using FIGS. 6-1 to 6-3, a method of folding the training tool shown in FIG. 5 so that the 12 cells overlap regularly, whereby the training tool can be folded compactly so as to form a single cell, will be described.

FIG. 6-1, which serves as a modified example of FIG. 5, illustrates the folding characteristics of an example combining the patterns of FIG. 1(A) and FIG. 3(A).

First, when a single column is extracted in the vertical direction from cells arranged on 4 rows by 3 columns, it can be seen that a similar configuration to that of the exercise tool shown in FIG. 1(A) is obtained. Hence, by folding the tool vertically about the first center line in a similar manner to the folding method shown in FIG. 2-1, the tool can be folded so that the outer edges of the upper and lower ends overlap (first fold).

Then, by performing the second fold about the second center line, as shown in FIG. 6-2, identical columns of cells to those shown in FIG. 3(C) can be obtained.

Accordingly, by performing the third fold about the third center line and performing the fourth fold about the fourth center line, as shown in FIG. 6-3, the training tool can be folded so that finally, the plurality of strips forming the 12 cells overlap each other on a single cell.

Moreover, the training tool according to the present invention is not limited to a combination of basic pattern 1 and basic pattern 2, as shown in FIG. 5, and by combining only basic pattern 2, a training tool having 3 rows by 3 columns, such as that shown in FIG. 7, for example, can be obtained. Furthermore, although not shown in the figures, by combining only basic pattern 1, a training tool having 4 rows by 4 columns can be obtained.

Further, the training tool according to the present invention is not limited to basic pattern 1 and basic pattern 2, as shown in FIGS. 1 and 3, and a configuration having 8 rows by 1 column or 1 row by 8 columns (basic pattern 3), such as that shown in FIG. 8, for example, can also be employed.

In this case, by folding the training tool vertically about a sixth center line, an identical configuration to that of basic pattern 1, shown in FIG. 1(A), is obtained, and therefore the tool can be folded into a single cell in a similar manner.

Likewise with respect to basic pattern 3, by combining basic pattern 3 with basic pattern 1 or basic pattern 2, exercise tools having 8 rows by 4 columns (4 rows by 8 columns) or 8 rows by 3 columns (3 rows by 8 columns) can be formed, and these tools can also be folded into a single cell in a similar manner.

Furthermore, as shown in FIG. 9, for example, a configuration having 5 rows by 1 column or 1 row by 5 columns (basic pattern 4) can also be employed.

In this case, by folding the training tool vertically about a fifth center line, an identical configuration to that of basic pattern 1, shown in FIG. 1(A), is obtained, and therefore the tool can be folded into a single cell in a similar manner. Likewise with respect to basic pattern 4, by combining basic pattern 4 with basic pattern 1 or basic pattern 2, exercise tools having 5 rows by 4 columns (4 rows by 5 columns) or 5 rows by 3 columns (3 rows by 5 columns) can be formed, and these tools can also be folded into a single cell in a similar manner.

The above applies similarly to basic configurations having a basic pattern of 6 rows by 1 column (1 row by 6 columns) or a basic pattern of 7 rows by 1 column (1 row by 7 columns), and these various basic patterns can also be combined as appropriate. In these cases also, by combining the basic pattern with basic pattern 1 or basic pattern 2, exercise tools having 6 rows by 4 columns (4 rows by 6 columns) or 6 rows by 3 columns (3 rows by 6 columns) can be formed, and these tools can also be folded into a single cell in a similar manner.

Specific examples were described above, but basically, assuming that i is an integer of 3 or more and j is an integer of 3 or more, as long as the cells on any one row, among cells arranged on i rows by j columns, are formed to be shorter in length than the cells on the other rows by the width of the strip and the cells in any one column are formed to be shorter in length than the cells in the other columns by the width of the strip, the cells can be folded into a single cell.

Hence, the training tool according to the present invention can be folded into a single cell even when formed from a plurality of cells, and therefore improvements can be achieved in convenience when tidying the tool away and convenience when storing or carrying the tool. At the same time, the strips (the net) are unlikely to become entangled, and therefore the labor required to unfold and use the tool from a folded state can be greatly reduced.

4. Training Method Using the Training Tool According to the Present Invention The training tool according to the present invention is unfolded and spread out on the floor or the ground so that the plurality of cells are disposed on the floor or the around, whereupon an exerciser moves and turns between the cells using walking, stamping moving, and direction-switching motions. Thus, motor functions and a cooperation function between the visual and motor centers of the brain can be trained, with the result that these respective functions can be maintained and strengthened.

Further, by imposing a rule prohibiting the exerciser from stepping on the strips (the net) and then measuring the number of times the exerciser steps on the strips, recording this number as a result, and having the exerciser compare his/her own past results with the results of others, the levels of the respective functions can be evaluated.

Comparing results in this manner motivates the user and therefore contributes to further improvements in the functions.

In a conventional training tool, the cells are all formed in the same size, and therefore, once a fixed step length has been memorized, the need to control the motor functions depending on the sense of sight tends to decrease, leading to a reduction in the effect of strengthening the cooperation function between the visual and motor centers.

Hence, in the training tool according to the present invention, some of the plurality of cells are formed in a different size to the other cells, thereby increasing the need for motion using the eyes, and in so doing, the effect of strengthening the cooperation function between the visual and motor centers has been successfully enhanced.

Furthermore, after memorizing a step advancement pattern, the user is required to move while recalling the memorized pattern, and therefore an improvement in cognitive functions and an effect of preventing the onset of dementia can also be expected.

A specific use method for the training tool according to the present invention, in which motor functions and a cooperation function between the visual and motor centers are trained by disposing a training tool having cells of a predetermined size, the predetermined size having been determined on the basis of the step length of a person, on the floor or the ground, determining advancement steps to be performed in time with a predetermined song or handclaps, and restricting the actions of the person so that the person does not step on the strips (the net), will be described below.

FIG. 10 is a view illustrating a step advancement pattern followed by the legs when the training tool according to the present invention is placed on the floor or the ground and moving, stamping, and direction-switching motions are performed thereon in time with a song.

FIG. 10 shows step advancement rules according to which a combination of stepping actions for stamping while remaining inside a cell and stepping actions for stepping into another cell and switching direction, as well as a sequence of steps, are determined on the basis of the rhythm of a predetermined song such as “Yukiya konko”, “Ame ame fure fure”, or “Seiya” to cause the exerciser to advance by performing steps in time with the song.

The trainee is required to memorize and then perform motions for stamping within the cell in which the feet are currently placed as well as stepping actions for stepping into another cell and stepping actions for switching direction in accordance with the stepping rules, and as a result, not only the memory center of the brain but also motor functions and a cooperation function between the visual and motor centers are trained.

Further, with the training tool according to the present invention, the movement range of the feet of a person is restricted by the cells of a predetermined size formed from the strips (the net). Hence, by having the trainee move after imposing a rule prohibiting the trainee from stepping on the strips (the net) having a predetermined width, the trainee can be trained to move while ascertaining the range of the cells and the width of the strips depending on the sense of sight and controlling his/her actions so as not to step on the strips.

In other words, sophisticated training can be implemented with respect to not only memory and motor functions but also judgment and motor functions realized through cooperation between the visual and motor centers, and as a result, higher human mental functions such as cognitive ability, attentiveness, and concentration can be activated.

More specifically, training effects are realized by the following mechanism.

In the following description, it is assumed, as an example, that the trainee has a height of approximately 150 to 170 cm, a foot size of approximately 22 to 26 cm, an inseam of approximately 60 to 70 cm, and a step length when the foot is swung lightly backward and forward of approximately 40 to 50 cm. Further, it is assumed that the inside lengths of the cell, i.e. L and W, are each set at 450 mm, which is close to the step length of the foot, so that the movement range of the trainee when performing foot stamping motions as well as moving and switching direction between the cells is restricted, thereby forcing the trainee to control the amount of movement appropriately within a range that is not too small and not too large relative to the step length of the foot. Furthermore, it is assumed that the width of the strips is set at 50 mm so that the strips are easy to see and stepping mistakes can be induced and determined easily.

(1) Stepping While Remaining Inside One Cell (Steps 1 and 2)

In steps 1 and 2, the trainee performs a stamping motion by raising and lowering the right foot and the left foot in turn in time with handclaps or the lyric “Yukiya” over three to four beats while maintaining balance so as not to wobble. Further, due to the relationship between the size of the feet and the size of the cell, the trainee must control the stamping motion (control using the motor center) within the small space inside one cell (1B), in which the two feet of the trainee only just fit, while observing the space (recognition using the visual center) and being restricted so as to remain within this narrow range. As a result, it is possible to train spatial awareness and the ability to control motion while remaining within a fixed range.

(2) Stepping in Order to Move to the Horizontally Adjacent Cell (Step 3)

After raising and lowering the left foot in step 2, in step 3, the trainee is required to perform a horizontal direction motion to step across the strip into the cell (1C) to the right with the right foot. At this time, the trainee controls the stepping motion (control using the motor center) of the foot in time with the song while making sure, depending on the sense of sight, not to step on the strip (recognition using the visual center) and while being restricted so as to remain within an approximately identical horizontal direction movement range to the step length (40 to 50 cm) when the foot is swung lightly. As a result, it is possible to train spatial awareness and the ability to control motion while remaining within a fixed range.

(3) Stamping While Legs are Horizontally Apart (Step 4)

Then, in a state where the positional relationship between the left foot of step 2 and the right foot of step 3 is such that the legs are horizontally apart, the trainee stamps the left foot in step 4 while being restricted so as to remain in the same cell (1B). Thus, the trainee is required to perform a balance-maintaining motion.

(4) Motion for Moving While Legs are Horizontally Apart (Step 5)

Then, while maintaining the right foot of step 3, the trainee is required to perform a motion for stepping with the left foot across the strip into the cell (2B) in front. At this time, the trainee controls the stepping motion (control using the motor center) for stepping forward with the left foot in time with the song while keeping an eye on the strip so as to make sure not to step on the strip (recognition using the visual center) and while being restricted by the configuration of the cell so as to have to widen the step length. As a result, it is possible to train spatial awareness and the ability to control motion while remaining within a fixed range.

(5) Motion for Moving to Diagonally Opposing Cell While Legs are Horizontally Apart (Step 6)

The trainee is then required to perform a motion for stepping with the right foot from the cell (1C) to the diagonally opposing cell (2B) from the state of the left foot of step 5 and the right foot of step 3. At this time, the trainee controls the motion (control using the motor center) for moving the feet while confirming depending on the sense of sight both the vertical direction strip and the horizontal direction strip so as not to step thereon (recognition using the visual center) and while narrowing the step length so that both feet remain within the small single cell (2B). As a result, it is possible to train spatial awareness in a different manner to (1) to (4), described above, as well as the ability to control motion while remaining within a fixed range.

(6) Direction-Switching Motion (Step 7)

By performing steps 5 and 6 from steps 3 and 4, the trainee moves in a forward direction, but in step 7, the trainee performs a direction-switching motion for direction-switching left.

Although not shown in the figures, an advancement pattern including direction-switching to an opposite direction may be prescribed in addition to direction switches in which the advancement direction turns to the left or right.

(7) Subsequent Steps

Thereafter, in steps 8 to 16, the visual and motor centers are trained further by having the trainee perform different motions under fixed restrictions.

(8) Effects Obtained when Other Trainees Participate

The training tool according to the present invention can be used not only to train a single trainee but also to train a plurality of trainees simultaneously, and by having the plurality of trainees perform motions simultaneously, the trainees can compete or cooperate with each other. As a result, an effect of encouraging the use of even higher motor functions and cooperation between the visual and motor centers can be achieved.

For example, with the training tool shown in FIG. 10, steps 1 to 7 and steps 9 to 15 are configured identically, and therefore, by having a second trainee step on the same position as step 1 when the first trainee performs step 9, the second trainee can advance using the same steps as the first trainee moving in front. Thus, the motions of the two trainees can be synchronized. At this time, the second trainee must move without stepping on the strips while aligning the timings of his/her actions depending on the sense of sight with those of the first trainee moving in front and while being restricted in terms of motion range by the cells. As a result, the cooperation function between the visual and motor centers can be trained more effectively.

Furthermore, although not shown in the figures, identical steps for advancing from row 1 to row 4 may be prescribed in relation to column A, column B, and column C, and a plurality of people may stand in a horizontal line and perform motions in time with each other. Likewise in this case, the trainees must perform the motions without stepping on the strips while aligning the timings of their actions with those of the plurality of other trainees and while being restricted in terms of motion range by the cells, and as a result, the cooperation function between the visual and motor centers can be trained more effectively.

(9) Effect of Making the Size of Some of the Cells Different to the Other Cells

In a conventional training tool, the cells are all the same size, and therefore, once the trainee becomes accustomed to the size of the cells to a certain extent, the brain memorizes the relationship between the size of the cells and the movement amount of the leg. Accordingly, the trainee becomes able to move while avoiding stepping on the strips of the cells without the need to check the feet depending on the sense of sight, and as a result, the effect of training higher motor control functions through cooperation between the visual and motor centers is reduced.

With the training tool according to the present invention, however, as shown in FIG. 10, for example, which is similar to FIG. 1(B), the vertical direction length of the cell on row no. 2, which is the second row from the bottom, is shorter than the lengths of the cells on row nos. 1, 3, and 4 by the width of the strip and the horizontal direction length of the cells in column B is shorter than that of columns A and C by the width of the strip. Hence, when moving from row no. 1 to row no. 2, which is slightly narrower, the size of the cell changes, and when moving from column C to column B, the cells of which are slightly narrower, the size of the cell changes, and therefore the trainee must move while constantly checking the positions of the strips of the cells depending on the sense of sight. As a result, the effect of training higher motor control functions through cooperation between the visual and motor centers can be enhanced.

(10) Other Modified Uses

Although not shown in the figures, by providing steps for causing the trainee to step outside the cells of the training tool, the trainee must ascertain the positions of the strips depending on the sense of sight in order to return accurately to the interior of the cell. Moreover, motion variation is increased, enabling an improvement in the effect of training the motion control functions.

5. Summary

Hence, with the training tool according to the present invention, by establishing a correlative relationship between the width of the strip and the size of the cell, the training tool can be folded compactly into a single cell even when the tool is constituted by a plurality of cells, and as a result, the tool does not become entangled or bulky when stored or carried. Moreover, the tool does not become entangled and difficult to disentangle when reused and can therefore be unfolded and put to use quickly.

Further, after determining the cell size and the strip width of the training tool on the basis of the relationship between the leg length and step length of a person, a rule prohibiting the trainee from stepping on the strips is imposed, whereupon the trainee is required to move between the plurality of cells or perform stamping motions within a cell at fixed timings in time with music, a song, or handclaps and in accordance with predetermined step advancement rules. At this time, the leg motions are restricted to a fixed range by the size of the cells, and therefore the motion control functions of the motor center can be trained effectively.

Furthermore, some of the cells have a different size to the other cells, and therefore the trainee is required to control his/her motions while relying more heavily on sight. As a result, the cooperation function between the visual and motor centers can be trained more effectively.

REFERENCE SIGNS LIST

100 Training tool
S Width of strip (net)
W Horizontal direction inside length of cell
L Vertical direction length of cell
M Vertical direction length of cell
N Horizontal direction length of cell

The invention claimed is:

1. A training tool to be unfolded and spread out on the floor or the ground, the training tool being configured to comprise strips of a predetermined width (S) extending in a vertical direction and a horizontal direction so as to form cells of a predetermined length, wherein the tool is constituted by cells arranged on i rows by 1 column or 1 row by j columns (where i and j are integers of 3 or more), and the cells on any one row or column are constituted by short cells having a length (M or N) that is shorter than a length (L or W) of the cells in the other rows or columns by a distance equal to the width (S) of the strip, and wherein the training tool is configured to be folded to form a single cell when the training tool is repeatedly folded.

2. A training tool to be unfolded and spread out on the floor or the ground, the training tool being configured to comprise strips of a predetermined width (S) extending in a vertical direction and a horizontal direction so as to form cells of a predetermined length, wherein the tool is constituted by cells arranged on i rows by j columns by combining cells arranged on i rows by 1 column, among which the cells in any one row are constituted by short cells having a length (M) that is shorter than a length (L) of the cells on the other rows by a distance equal to the width (S) of the strip, and cells arranged on 1 row by j columns, among which the cells in any one column are constituted by short cells having a length (N) that is shorter than a length (W) of the cells in the other columns by a distance equal to the width (S) of the strip, and wherein the training tool is configured to be folded to form a single cell when the training tool is repeatedly folded.

3. The training tool according to claim 1, the tool being constituted by cells arranged on i rows by 1 column, wherein, when i is 4 such that the tool is constituted by cells arranged on 4 rows by 1 column, and a first fold is performed vertically using, as a first center line, an outer edge of a center strip that divides the entire tool vertically into two such that an uppermost strip and a lowermost strip of the tool overlap each other, a vertical deviation corresponding to the width of the strip occurs between a strip of the short cell and a strip of the other folded row, and when a second fold is further performed vertically using a gap between the two strips, which is formed by the deviation, as a second center line, the strips forming all of the cells overlap each other, whereby the tool is folded so as to form a single cell.

4. The training tool according to claim 1, the tool being constituted by cells arranged on 1 row by j columns, wherein, when j is 3 such that the tool is constituted by cells arranged on 1 row by 3 columns, and a first fold in left and right direction is performed using one of the outer edges of the short cell as a first center line that separates the tool from the left and right direction such that the strips of the short cell and the strips forming another cell overlap each other, whereupon a second fold in left and right direction is performed using the other outer edge of the short cell as a second center line that separates the tool from the left and right direction such that the strips of the short cell and the strips forming the other cells overlap each other, the strips forming all of the cells overlap each other, whereby the tool is folded so as to form a single cell.

5. The training tool according to claim 2, the tool being constituted by cells arranged on i rows by j columns, wherein, when i is 4 and j is 3 such that the tool is constituted by cells arranged on 4 rows by 3 columns, a first fold is performed vertically using, as a first center line, an outer edge of a center strip that divides the entire tool vertically into two such that an uppermost strip and a lowermost strip of the tool overlap each other, a vertical deviation corresponding to the width of the strip occurs between a strip of the short cell and a strip of the other folded row, and when a second fold is further performed vertically using a gap between the two strips, which is formed by the deviation, as a second center line, whereby the tool is folded so as to form cells of 1 row by 3 columns, a third fold is performed using one of the outer edges of the short cell as a third center line such that the strips of the short cell and the strips forming another cell overlap each other, whereupon a fourth fold is performed using the other outer edge of the short cell as a fourth center line such that the strips of the short cell and the strips forming the other cells overlap each other, whereby the strips forming all of the 12 cells on the 4 rows by 3 columns overlap each other, and the tool is folded so as to form a single cell.

6. The training tool according to claim 2, the tool being constituted by cells arranged on i rows by j rows, wherein, when i is 8 and j is 3 such that the tool is constituted by cells arranged on 8 rows by 3 columns, by performing a fold using, as a center line, the outer edge of the center strip that divides the entire tool vertically into two, whereby making the tool to be constituted by cells arranged on 4 rows by 3 columns, then a first fold is performed vertically using, as a first center line, an outer edge of a center strip that divides the entire tool vertically into two such that an uppermost strip and a lowermost strip of the tool overlap each other, a vertical deviation corresponding to the width of the strip occurs between a strip of the short cell and a strip of the other folded row, and when a second fold is further performed vertically using a gap between the two strips, which is formed by the deviation, as a second center line, whereby the tool is folded so as to form cells of 1 row by 3 columns, a third fold is performed using one of the outer edges of the short cell as a third center line such that the strips of the short cell and the strips forming another cell overlap each other, whereupon a fourth fold is performed using the other outer edge of the short cell as a fourth center line such that the strips of the short cell and the strips forming the other cells overlap each other, and the strips forming all of the 24 cells on the 8 rows by 3 columns overlap each other, whereby the tool is folded so as to form a single cell.

* * * * *